Nov. 8, 1955 A. J. VASSELLI 2,723,314

AUTOMATIC TELEPHONE DIALING DEVICE

Filed Aug. 11, 1953 4 Sheets-Sheet 1

INVENTOR.
ANTHONY J. VASSELLI

BY Victor D. Borst
ATTORNEY

Nov. 8, 1955 A. J. VASSELLI 2,723,314

AUTOMATIC TELEPHONE DIALING DEVICE

Filed Aug. 11, 1953 4 Sheets-Sheet 2

INVENTOR.
ANTHONY J. VASSELLI

BY Victor D. Borst

ATTORNEY

Nov. 8, 1955 A. J. VASSELLI 2,723,314

AUTOMATIC TELEPHONE DIALING DEVICE

Filed Aug. 11, 1953 4 Sheets-Sheet 3

INVENTOR.
ANTHONY J. VASSELLI

BY Victor D. Borst

ATTORNEY

Nov. 8, 1955 A. J. VASSELLI 2,723,314

AUTOMATIC TELEPHONE DIALING DEVICE

Filed Aug. 11, 1953 4 Sheets-Sheet 4

INVENTOR.
ANTHONY J. VASSELLI

BY Victor D. Borst
ATTORNEY

United States Patent Office 2,723,314

Patented Nov. 8, 1955

2,723,314

AUTOMATIC TELEPHONE DIALING DEVICE

Anthony J. Vasselli, West Orange, N. J.

Application August 11, 1953, Serial No. 373,515

11 Claims. (Cl. 179—90)

The present invention relates to an automatic dialing actuator and particularly to a device for automatically performing the normally manual operations in connection with the transmission of impulse signals of a dial type telephone.

It is an object of this invention to provide a dial engaging device which substantially reduces the number of manual operations associated with dialing a telephone number. The device has particular advantage in business places where certain numbers are frequently and repeatedly called. Its employment not only saves considerable time for the operator but reduces the margin of error in making telephone connections.

Automatic dial engaging devices are known in the art. Their principle of operation differs from the instant dialing device especially with respect to the driving means for the dial actautor and the timing means provided for the driving means. The dial actuator in the instant case does not permanently engage the dial but truly simulates the intermittent finger engagement normally incident to telephone dialing. Because connection is made only while the dial is being wound and is broken during signal transmission, the driving means may be unidirectional in movement. This results in greater mechanical efficiency and simplicity of design. The art is replete with devices which provide either electromagnetic or mechanical means for causing reversal of the dial actuator once the predetermined degree of rotation is achieved. This invention dispenses with the requirement of reversability and operates entirely in one direction at a uniform rate.

The power supply being continuous during the entire period of operation, means are provided to disengage the driving means for the dial actuator from the power supply for specified time intervals corresponding to the return movement of the dial. This provision for periodic disengagement between the motor and the driving or rotating means for the dial actuator is critical in that it permits the continuous operation of the control element which retains the dial actuator in a retracted position while the dial actuator is not being rotated and releases the actuator to the control of an independently operated element as soon as the actuator resumes its rotary movement. The intermittent operation of the latter control elements and actuator and the continuous operation of the former control elements require an alternately periodic connection and disconnection in the driving gear train to allow for the necessary activity in one part of the device while the rest of it is necessarily stopped.

It is an object of the invention therefore to provide a unidirectional dial actuating device which maintains constant engagement between the dial engaging actuator and its immediate driving connections and periodic engagement between these connections and the continuously operated driving members.

Though the dial actuator is in constant engagement with its driving means, the driving means are unidirectionally operated. This is possible due to the intermittent engagement of the dial actuator and the dial itself. In effect the dial actuator engages the dial only during its winding and then withdraws therefrom to permit the dial to unwind out of contact with the actuator. The means for causing the advance and recession of the dial actuator in accordance with a control timer is entirely mechanical and determines the arc of dial rotation for each individual digit in the call number. It is therefore a further object of the invention to provide an automatic dial actuating device the dial actuator of which intermittently engages the dial in accordance with a preset timing mechanism. The advantage of this provision is the elimination of stops or abutments for abruptly halting dial operation at preselected locations.

A still further object of the invention is to provide an automatic dial actuator having an exclusively mechanical timing control mechanism. The operation of the dial actuator is positively controlled. As compared with electronic controls, the control mechanism is more durable and quicker in operation, there being no possibility of time lags which is a problem frequently encountered, for example, in the case of electromagnetic control.

A further object of the invention is to provide an automatic dialing device which is readily adapted to standard telephone casements and has means to facilitate disconnection therefrom for ordinary manual telephone usage.

Another object of the invention is to provide common operative elements for both preselecting a telephone call number and starting the mechanism to dial the number automatically.

Another object of the invention is to provide means in an automatic dialing device for automatically stopping the device after signal transmission has been completed.

Other objects and advantages of my invention may appear from the following particular description of one embodiment thereof which is shown in the accompanying drawings in which.

Figure 1:
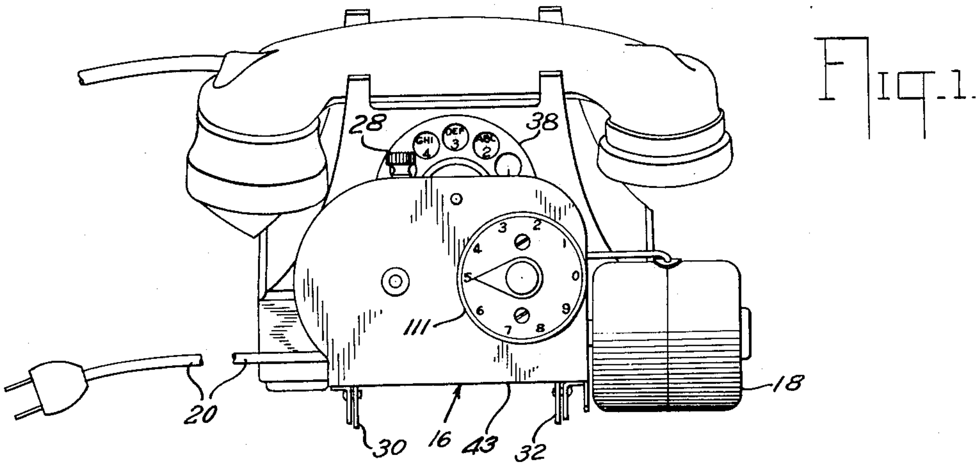
Fig. 1 is a front view of the automatic telephone dialing device.
Figure 2:
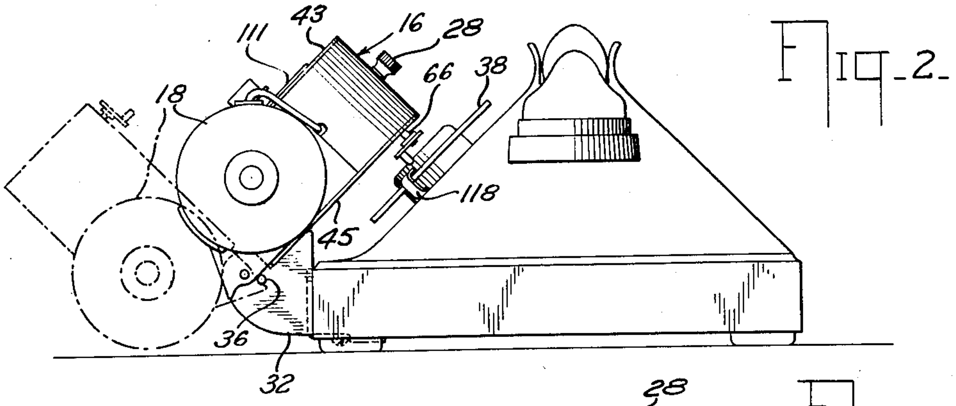
Fig. 2 is a side elevation of the automatic device in position to engage a telephone dial and in open position.
Figures 3, 4:
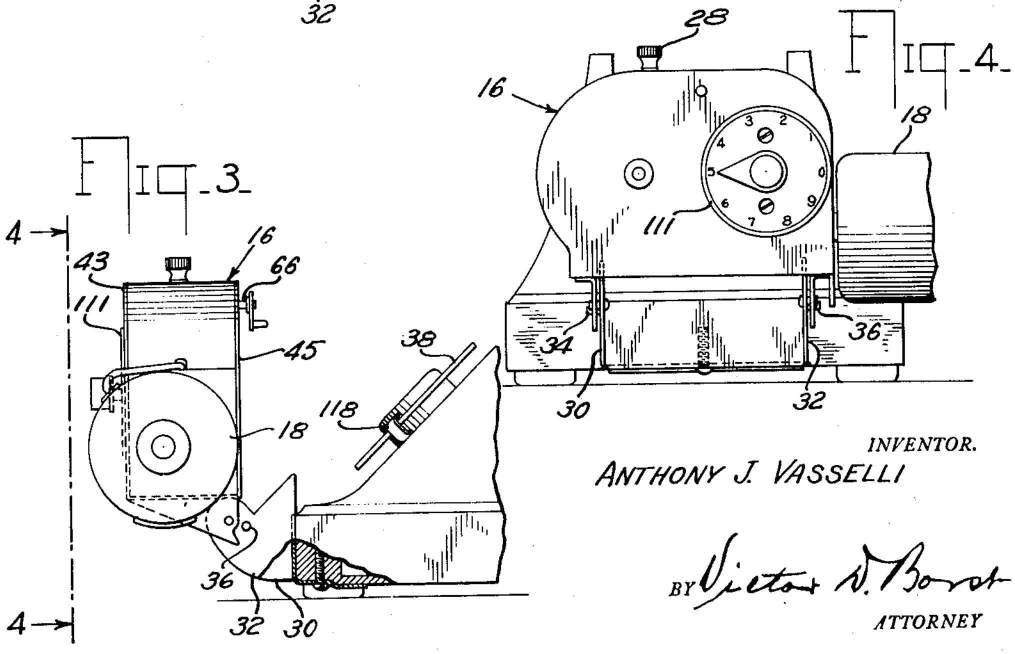
Fig. 3 is a side elevation of same in open vertical position for permitting normal telephone usage.
Fig. 4 is a front elevation of the apparatus embodying the invention taken on the line 4—4 of Fig. 3.
Figure 5:
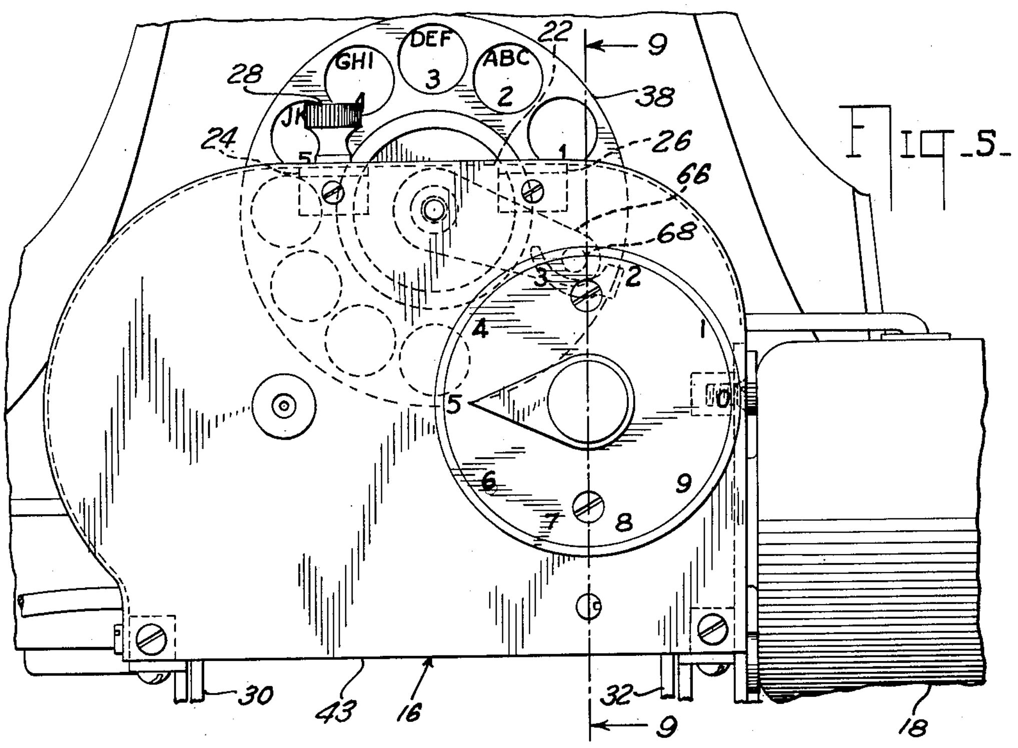
Fig. 5 is a front view of the dialing device on enlarged scale.
Figure 6:
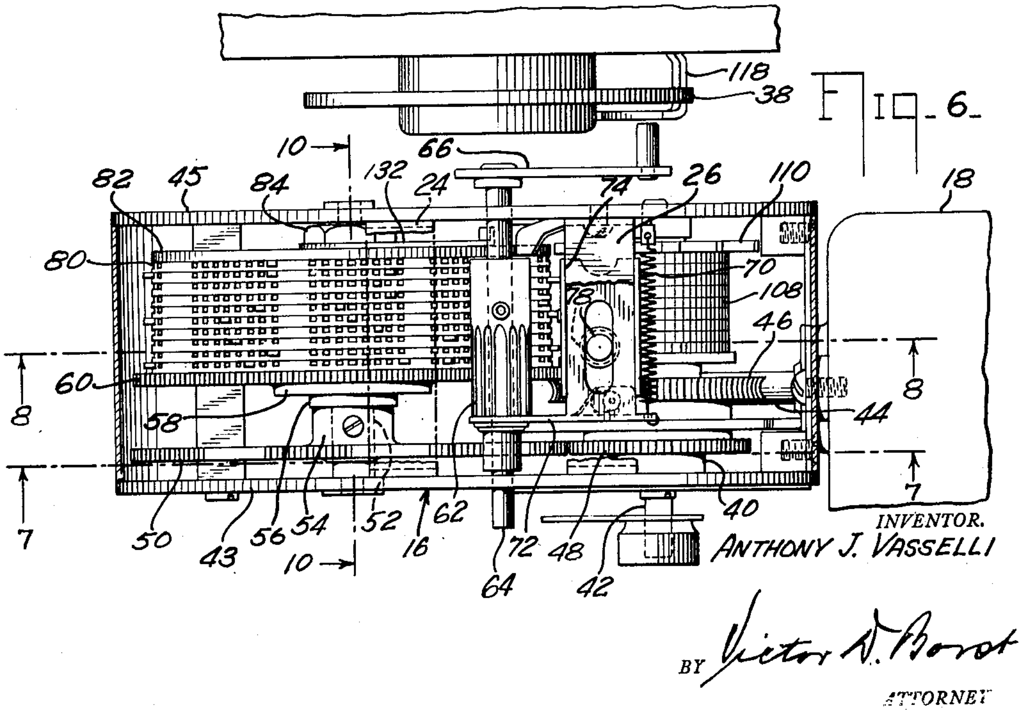
Fig. 6 is a plan in partial section showing the operative elements in full.
Figure 7:
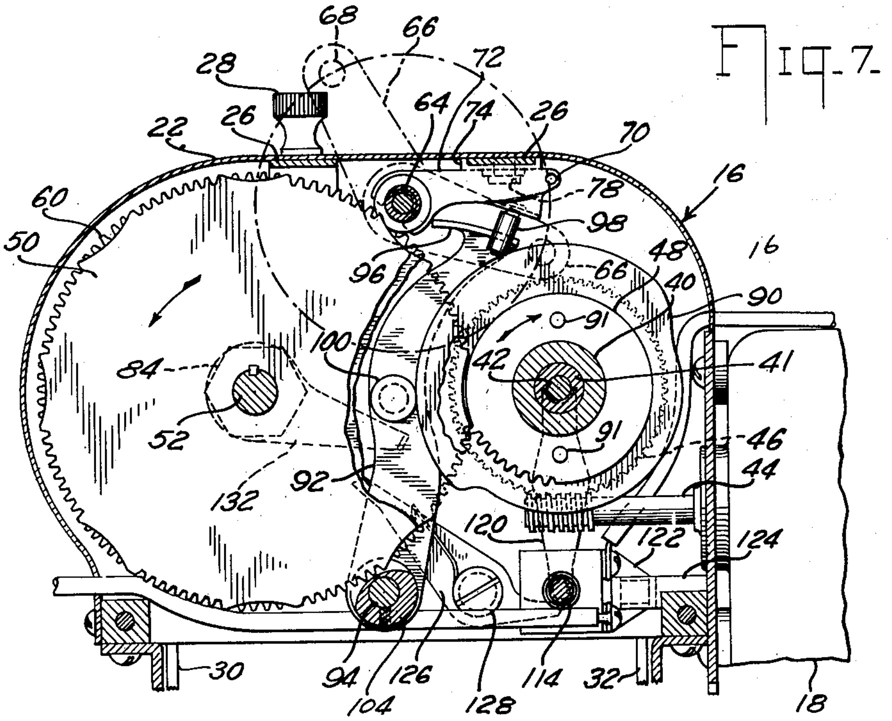
Fig. 7 is a section taken on the line 7—7 of Fig. 6.
Figure 8:
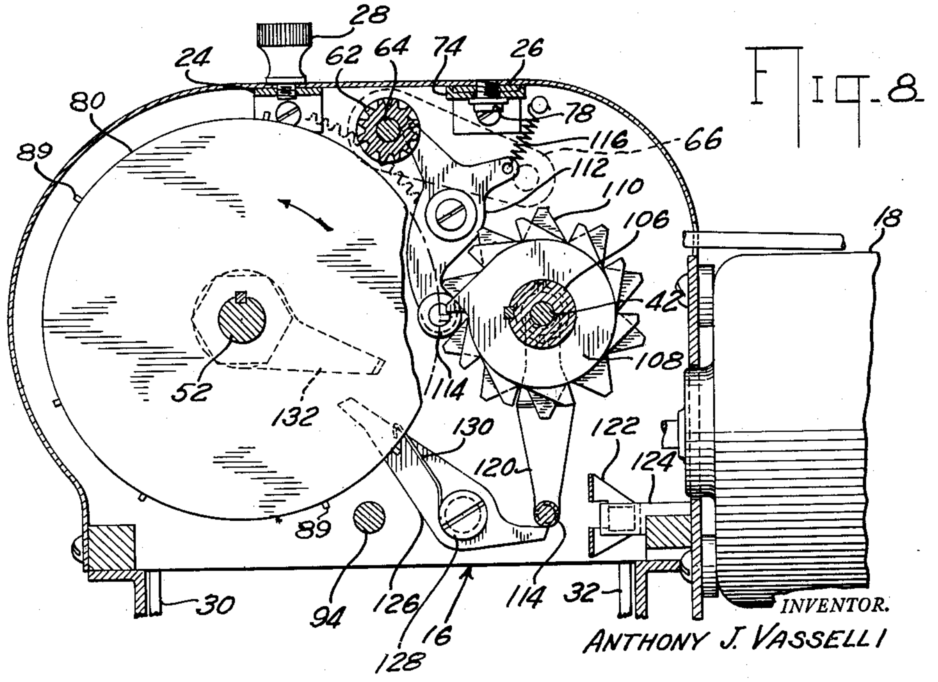
Fig. 8 is a section taken on the line 8—8 of Fig. 6.

The automatic telephone dialing device 16 is powered by motor 18 having a wall outlet cord 20 which is connected with the motor through an automatic switch hereinafter described. The device is normally completely enclosed but has a removable top plate 22 supported by brackets 24 and 26 being removably held thereto by retaining screw 28. The device 16 is pivotally secured to telephone side brackets 30 and 32. Bracket pins 34 and 36 limit the pivotal movement away from telephone dial 38 in order to minimize the possibility of damage in its disengageable position.

The motor 18 is in constant driving connection with a rotatable sleeve 40 supported by a bushing 41 which rotatably supports dial shaft 42. The bushing 41 is securely mounted in the front plate 43 of the dialing device. The dial shaft 42 extends coaxially through the sleeve 40 and is mounted in the front plate 43 and back plate 45 for rotation. Worm 44 is in driving connection with the armature of motor 18 and engages worm gear 46 mounted on the freely rotatable sleeve 40. Segmental gear 48 is keyed to sleeve 40 and is driven thereby. Uniform intermittent gear 50 is in intermittent engagement with the segmental gear 48 and is mounted on shaft 52 to drive shaft 52 by virtue of its keyed connection therewith. Between the uniformly spaced groups of teeth on the periphery of gear 50 are concave arcuate portions adapted to receive in close adjacency the convex periphery of segmental gear 48 thus locking the gear 50 when the two gears are disengaged. The gear 50 is driven intermittently at a uniform rate by the segmental gear. This intermittent uniform movement is essential to the timing operation of the device to be described.

Also mounted on shaft 52 and separated from the uniform intermittent gear 50 by a hub 54 and washer 56 is gear 60. Actuator gear 62 mounted on actuator shaft 64 is in constant engagement with gear 60. The actuator shaft 64 extends through the front and back plates, 43 annd 45 respectively, and is capable of rotative and axial movement therein. The elongated actuator gear 62 is axially adjustable and proportioned to maintain its teeth in mesh with cooperative gear 60 throughout its range of adjustment. Attached to the protruding end of the actuator shaft 64 adjacent the back plate 45 is dial actuator 66 having a finger 68 adapted to enter the openings in a telephone dial. The actuator shaft 64 and dial actuator 66 is under constant bias by means of spring 70 which is connected to back plate 45 and the free end of transverse arm 72 the other end of which is mounted on actuator shaft 64. Guide plate 74 is carried by arm 72 and is adapted to slide on the under side of bracket 26 which is slotted to permit a bracket and plate retaining screw 78 to move with the guide plate. It is the function of the guide plate to assure that the bias of the actuator shaft is principally in the same direction as that of the spring which provides the bias.

Figures 9, 10, 11, 12, 13:
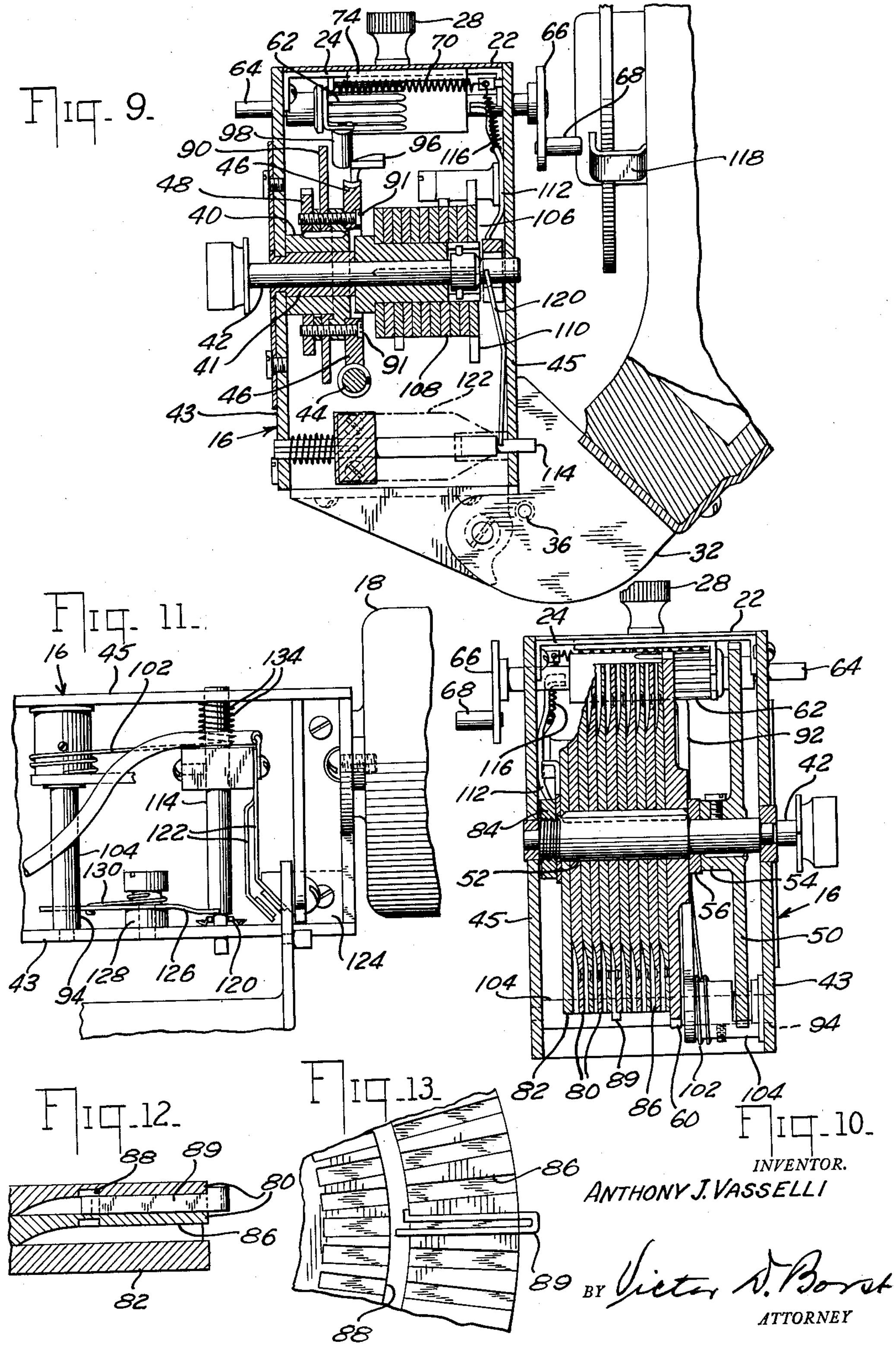
Fig. 9 is a section taken on the line 9—9 of Fig. 5.
Fig. 10 is a section taken on the line 10—10 of Fig. 6.
Fig. 11 is a detail of the automatic switch arrangement.
Fig. 12 is an enlarged detail in section of two times discs, timer pins and retaining plate.
Fig. 13 is a fragmentary view of a timer disc showing means for retaining the radially projecting timer pins.

Timer discs 80 are mounted for rotation on shaft 52, between gear 60 and retaining plate 82. Each disc represents a preselected call number and is held against relative rotative movement on the shaft 52 by nut 84 which bears against the retaining plate 82. Each disc has grooves 86 cut in one of its faces. The grooves are disposed radially in uniformly spaced groups with the grooves in each group corresponding to the ten digits from zero to nine as they appear respectively on the telephone dial. There being a maximum of eight digits in a usual call number there are eight groups of ten grooves represented on the timer discs. A circumambient groove 88 near the periphery is disposed in the groove face of each disc so as to intersect the radial grooves 86. The discs are keyed to the shaft 52 with each group of grooves aligned, each groove being covered by the succeeding disc or by the retaining plate 82 to form perforations. Timer pins 89 having outwardly biased legs are disposed in each group of perforations. One leg of each timer pin has an outwardly extending foot adapted to snap into the groove 88 as the timer pin is inserted. As shown in Figs. 12 and 13 each leg has a shoulder formed near the head of the pin in order that the length of the protruding portion will be uniformly maintained during operation.

According to the invention the dial actuator 66 must make one revolution while the timer disc has been rotated through an arc corresponding to the portion of its circumference occupied by one group of grooves and the intervening space between successive groove groups. Because in the preferred form of the invention this arcuate portion is equivalent to one-eighth of the circumference of the timer disc, the gear ratio of the gear 60 and the actuator gear 62 is eight to one.

Cam 90 is keyed to sleeve 40 and is tied to worm gear 46 by screws 91 in order that the gear and cam may be driven together by the sleeve 40. Lever arm 92 is pivotally mounted on lever shaft 94. Cam 96 is carried by the free end of the lever arm and presents an inclined surface to a rotatable roller 98 carried by and depending from the arm 72. The spring 70 urges the roller against the cam 96. A second cam follower in the form of a roller 100 is mounted on the intermediate portion of lever arm 92 and is urged against the surface of the cam 90 by wire spring 102. One end of the spring 102 is connected to the lever arm 92 and the other end is helically wrapped about a hub 104 of shaft 94.

An annulus 106 is mounted on dial shaft 42 to be turned thereby. Inner dials 108 and star wheel 110 are mounted on the annulus and are held against relative rotation. As there are ten timer discs so there are ten adjacent inner dials. The ten inner dials have ratchet teeth disposed in as many separate directions. Each tooth is adapted to contact the pins on the corresponding timer disc for its dial. Because the teeth are differentially disposed, only one can be brought into operative position adjacent the timer discs at a time. An outer dial 111 informs the user which of the ten inner dials has been brought into operative position adjacent its corresponding timer disc. The timer discs and inner dials rotate as units. In a less preferred form these discs and dials could comprise integrally cylindrical elements instead of separate components for each call number.

A pivotal link element 112 has a lower arm with an inwardly projecting roller 114 mounted thereon and an upper arm adapted to abut on the inner end of the actuator gear 62. A spring 116 biases the roller 114 against the star wheel 110 which is so mounted on the dial shaft 42 that the desired inner dial is resiliently held in operative position vis a vis its corresponding timer disc.

Contact between the timer pins and an inner dial during operation of the device causes the star wheel to rock on the dial shaft and accordingly move the upper arm of the link 112 to pivot it away from the actuator shaft 64 thus releasing the spring biased dial actuator and permit it to project into the proper opening of the telephone dial. As soon as the dial actuator has wound the dial as far as the finger stop 118 the gear 60 has made one-eighth of a revolution and therefore the intermittent gear 50 and segmental gear 48 are disengaged. The rotation of the dial actuator is stopped and the sleeve 40 continues to turn. The intermittent gears do not reengage until the telephone dial has completely unwound. The instant of the disengagement between the intermittent gears, the dial actuator is retracted by positive action from the dial by means of the cam 90, lever arm 92, cam 96 and roller 98 mounted on the actuator shaft 64. Retraction of the dial actuator permits the upper arm of the link 112 to again position itself against the actuator gear 62. The surface of cam 90 is cut so as to cause the cam 96 to move away from the dial actuator as the teeth of the intermittent gears again come into engagement.

Retraction of the dial actuator permits the upper arm of the link 112 to again position itself against the actuator gear 62 to hold the dial actuator in retracted position. The surface of cam 90 is cut so as to cause the cam 96 to move away from the dial actuator as the teeth of the intermittent gears again come into engagement. The timed projection of the dial actuator towards the telephone is therefore under the exclusive control of the link 112 while the dial actuator 66 is being rotatively driven. The cycle is repeated seven or eight times depending on the number of digits in the preselected call number. When the shaft 52 has made a complete revolution and all seven or eight digits have been dialed the device is shut off by an automatic switch arrangement described below.

Dial shaft 42 is axially as well as rotatively and, as explained, it is employed to preselect a call number by bringing the inner dials into operative relation with the timer discs. It is also used to start the device and for that purpose has connected to its inner end portion within the device a flat element 120 which is bent on a line near its forked connection with the dial shaft 42. The other end of the element 120 is adapted to engage a shoulder of spring biased slidable rod 114. Two contactors 122 are carried by rod 114 which are caused to close with depression of the dial shaft 42. One contactor is connected to the outlet cord 20 and the other to the motor 18. Depressing dial shaft 114 and the consequent lifting of rod 114 forces the two electrical contactors together due to the presence of a stopping block 124 which in effect limits the travel of one contactor. A pivotal link member 126 having an arm also adapted to engage the shoulder of rod 114 is pivotally mounted on a post 128 and is urged toward rod 114 by wire spring 130. This engagement is effected when the portion of rod 114 having a reduced diameter is shifted to a position adjacent the arm of member 126 as a result of depressing the dial shaft 42. A cooperative link member 132 is mounted on shaft 52 and is adapted to contact link member 126 and pivot its arm out of engagement with rod 114. This action releases the rod 114 and it returns under the urging of spring 134 to an inoperative position which permits the contactors 122 to open and thus break the power circuit to the motor 18. The two cooperative link members engage when the shaft 52 has made a complete revolution and all the digits of the preselected call number have been dialed.

While the above description discloses what is deemed to be a practical and officient embodiment of the present invention, it is understood that the invention is not limited thereto, as changes and substitutions of parts in the mechanical arrangement of the device might well be made without departing from the principle of the invention as defined in the accompanying claims.

What is claimed is:

1. An automatic telephone dialing device having a projectable and retractable dial actuator, a motor, a rotatable sleeve, a constant gear connection between said motor and sleeve, an intermittent gear connection between said sleeve and said dial actuator, whereby the dial actuator is rotated intermittently by the sleeve, dial actuator releasing means operatively driven from said intermittent gear connection to project the dial actuator through a predesignated opening in the telephone dial and dial actuator retracting means continuously driven by the sleeve to retract said dial actuator the instant the driving connection from the motor to the dial actuator through the intermittent gear connection is broken and positively maintain the dial actuator in retracted position until said motor to dial actuator driving connection is resumed.

2. An automatic telephone dialing device having a projectable and retractable dial actuator, a shaft, a timer disc mounted on said shaft and having uniformly spaced groups of radial grooves with each groove corresponding to a digit on the dial and adapted to receive radially projecting pins, a gear on the said shaft in constant engagement with said dial actuator, a motor in intermittent connection with said shaft, mechanical control means adapted to project said dial actuator through a predesignated opening in the telephone dial and means to retract said dial actuator the instant the said actuator has reached a rotative position corresponding to the extreme position the zero opening of the dial may attain in a clockwise rotation thereof.

3. An automatic telephone dialing device having a spring biased projectable and positively retractable dial actuator, a shaft, a timer disc mounted on said shaft and having uniformly spaced groups of radial grooves with each groove corresponding to a digit on the dial and adapted to receive radially projecting pins, a gear on the said shaft in constant engagement with said dial actuator, a motor in intermittent connection with said shaft, pins selectively inserted in the said groups of grooves, a dial shaft, an inner dial mounted on said dial shaft and having a ratchet tooth adapted to contact said pins when said inner dial is rotatively set to bring said tooth adjacent the timer disc, a star wheel mounted on said dial shaft, a link one end of which is in spring biased contact with the teeth of said star wheel and the other end of said link being adapted to engage said dial actuator in retracted position and release said actuator when pivoted therefrom by said star wheel and means to retract said dial actuator while the motor is disconnected from said shaft.

4. An automatic telephone dialing device having a spring biased projectable and positively retractable dial actuator, a shaft, a timer disc mounted on said shaft and having uniformly spaced groups of radial grooves with each groove corresponding to a digit on the dial, a gear mounted on said shaft in constant engagement with said dial actuator, means associated with said timer disc to release said dial actuator to effect engagement with the dial, a motor in intermittent connection with said shaft, the ratio of said dial actuator and said disc being the number of groups of radial grooves in said disc to one and means to retract said dial actuator while the motor is disconnected from said shaft.

5. An automatic telephone dialing device having a spring biased projectable and positively retractable dial actuator, a motor, a timer disc, means associated with said timer disc to release said dial actuator to effect engagement with the dial, a sleeve, a rotatable cam mounted on said sleeve and driven by said motor, a lever arm one end of which has a roller adapted to follow the surface of said cam, the other end of said lever arm being adapted to engage said dial actuator to effect retraction thereof, and means to rotate intermittently said timer disc and said dial actuator.

6. An automatic telephone dialing device having a spring biased projectable and positively retractable dial actuator, a shaft, a timer disc mounted on said shaft and having uniformly spaced groups of radial grooves with each groove corresponding to a digit on the dial and adapted to receive radially projecting pins, a gear on the said shaft in constant engagement with said dial actuator, a motor in intermittent connection with said shaft, pins selectively inserted in the said groups of grooves, a dial shaft, an inner dial mounted on said dial shaft and having a ratchet tooth adapted to contact said pins when said inner dial is rotatively set to bring said tooth adjacent the timer disc, a star wheel mounted on said dial shaft, a link one end of which is in spring biased contact with the teeth of said star wheel and the other end of said link being adapted to engage said dial actuator in retracted position and release said actuator when pivoted therefrom by said star wheel, a sleeve coaxially disposed to rotate freely about said dial shaft, a rotatable cam mounted on said sleeve and driven by said motor, a lever arm one end of which has a roller adapted to follow the surface of said cam, the other end of said lever arm being adapted to engage said dial actuator to effect retraction thereof.

7. An automatic telephone dialing device having a spring biased projectable and positively retractable dial actuator, a shaft in constant connection with said dial actuator, a timer disc mounted on said shaft and having uniformly spaced groups of radial grooves with each groove corresponding to a digit on the dial, pins selectively inserted in the said groups of grooves, a dial shaft, an inner dial mounted on said dial shaft and having a ratchet tooth adapted to contact said pins when said inner dial is rotatively set to bring said tooth adjacent the timer disc, a star wheel mounted on said dial shaft, a link one end of which is in spring biased contact with the teeth of said star wheel and the other end of said link being adapted to engage said dial actuator in its retracted position and release said actuator when pivoted therefrom by said star wheel, a sleeve coaxially disposed to rotate freely about said dial shaft, a rotatable cam mounted on said sleeve, a lever arm one end of which has a roller adapted to follow the surface of said cam, the other end of said lever arm being adapted to engage said dial actuator to effect retraction thereof and a motor in constant engagement with said rotatable sleeve, said sleeve being in intermittent engagement with said first mentioned shaft.

8. An automatic telephone dialing device as claimed in claim 7 wherein the means for effecting the intermittent engagement between said sleeve and said first mentioned shaft includes a uniform intermittent gear mounted on said shaft and an intermittently engaging segmental gear mounted on said sleeve, said segmental gear being uniformly driven by the motor.

9. An automatic telephone dialing device having a spring biased, projectable and positively retractable dial actuator, a shaft, timer discs mounted on said shaft, each disc having uniformly spaced groups of radial grooves with each groove corresponding to a digit on the dial and adapted to receive radially projecting pins, a gear on the shaft in constant engagement with said dial actuator, a motor in intermittent connection with said shaft, pins selectively inserted in the said groups of grooves, a dial shaft, inner dials mounted on said dial shaft, said inner dials having axially and peripherally spaced ratchet teeth adapted to contact the pins carried by a corresponding timer disc when rotated into adjacency with said disc, a star wheel mounted on said dial shaft, a link one end of which is in spring biased contact with the teeth of said star wheel and the other end of said link being adapted to engage said dial actuator in retracted position and release said actuator when pivoted therefrom by said star wheel and means to retract said dial actuator.

10. An automatic telephone dialing device having a spring biased projectable and positively retractable dial actuator, a shaft, a timer disc mounted on said shaft and having uniformly spaced groups of radial grooves with each groove corresponding to a digit on the dial and adapted to receive radially projecting pins, a gear on the said shaft in constant engagement with said dial actuator, a motor in intermittent connection with said shaft, mechanical control means adapted to project said dial actuator through a predesignated opening in the telephone dial, means to retract said dial actuator the instant the said actuator has reached a rotative position corresponding to the extreme position the zero opening of the dial may attain in a clockwise rotation thereof and means to automatically shut off said motor when said timer disc has rotated one revolution.

11. An automatic telephone dialing device as claimed in claim 10 wherein the means for automatically shutting off the motor include an outwardly biased and axially movable rod having a shoulder near its inner end, a dial shaft, a bent flat element one end of which is connected to said dial shaft and the other end being connected to said rod, a link member adapted to engage the shoulder of said rod when the latter is moved axially by said dial shaft, two contactors carried by said rod, a stopping block positioned to limit the travel of one of said contactors, said contactors being closed on the depression of the dial shaft and opened when the latter is returned to normal or inoperative position, and a second link member mounted on said shaft and adapted to contact said first mentioned link member and release it from its engagement with the shoulder of said rod thus permitting the dial shaft and rod to return to their normal positions and open the contactors.

References Cited in the file of this patent

UNITED STATES PATENTS

| | | |
|---|---|---|
| 1,870,547 | Wise | Aug. 9, 1932 |
| 2,100,518 | Rinkow | Nov. 30, 1937 |
| 2,579,983 | Thornton | Dec. 25, 1951 |